No. 816,269. PATENTED MAR. 27, 1906.
C. STENGEL.
CASTER.
APPLICATION FILED SEPT. 2, 1905.
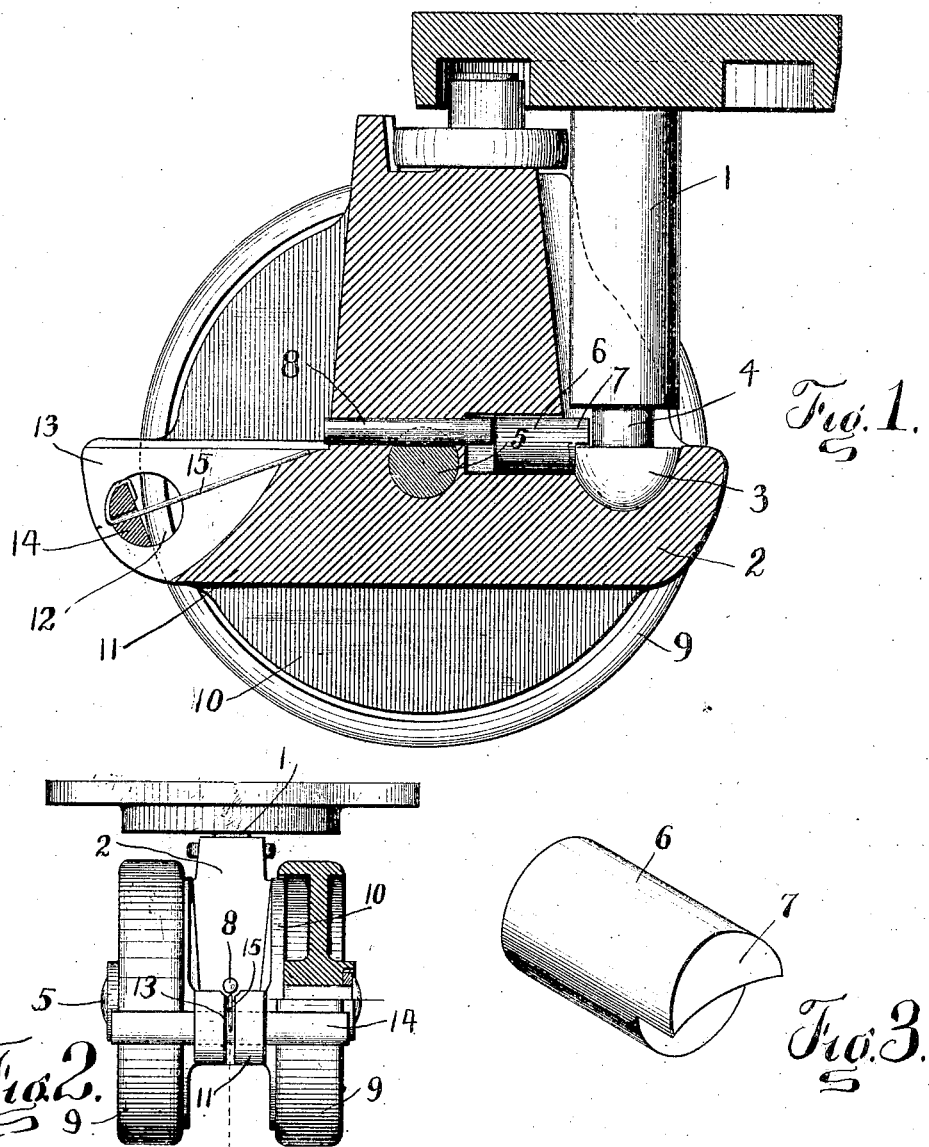
Witnesses:
Elmer R. Shipley.
M. S. Belden.
Charles Stengel
Inventor
by James W. See
Attorney

UNITED STATES PATENT OFFICE.

CHARLES STENGEL, OF HAMILTON, OHIO.

CASTER.

No. 816,269.  Specification of Letters Patent.  Patented March 27, 1906.

Application filed September 2, 1905. Serial No. 276,781.

*To all whom it may concern:*

Be it known that I, CHARLES STENGEL, a citizen of the United States, residing at Hamilton, Butler county, Ohio, (post-office address No. 114 North Front street, Hamilton, Ohio,) have invented certain new and useful Improvements in Casters, of which the following is a specification.

This invention, pertaining to improvements in casters for furniture, will be readily understood from the following description, taken in connection with the accompanying drawings, in which—

Figure 1 is a vertical section in a plane at right angles to the axis of the axle of a caster, exemplifying my invention; Fig. 2, a rear elevation of the same, one of the wheels appearing partly in vertical diametrical section; and Fig. 3, a perspective view of the union-block.

In the drawings, 1 indicates the usual stem; 2, the housing; 3, the hemispherical lower end of the stem engaging a step-bearing in the housing; 4, a circumferential groove at the lower end of the stem; 5, the axle passing horizontally through the housing; 6, a union-block in the form of a cylindrical plug seated in a cylindrical socket in the front face of the housing to the rear of the stem, the axis of this socket being in substantially the same horizontal plane as the lower shore of the groove in the stem; 7, a tongue projecting from the front upper portion of the union-block and into the groove of the stem, the lower surface of this tongue engaging the lower shore of the groove in the stem and being substantially in the same plane as the axis of the union-block; 8, a horizontal pin fitting tightly in the hole in the housing in rearward prolongation of the socket containing the union-block, this pin passing through a notch in the axle to prevent the endwise displacement of the latter; 9, the two floor-wheels; 10, guard-flanges formed upon the sides of the housing and disposed within the rims of the floor-wheels; 11, a horn projecting rearwardly from the housing between the two floor-wheels; 12, a horizontal aperture, preferably circular in form, through this rearwardly-projecting horn, its axis being substantially in line with peripheries of the floor-wheels; 13, a vertical slit in the rearwardly-projecting horn at right angles to the axis of aperture 12; 14, a scraper, preferably of semicircular form, supported in the aperture 12 and extending at each side of the horn and having its lower edge in engagement with the treads of the floor-wheels, and 15 a wire spring disposed within the slit 13 and having its heel secured to the scraper 14, its free end bearing downwardly upon a portion of the housing.

The union-block 6 serves in coupling the housing to the stem and is free for rotation in the socket in the housing. As the housing oscillates with reference to the stem the union-block turns in its socket, thus permitting the lower flat surface of the tongue 7 to maintain constant relationship to the lower shore of the groove in the stem, the flat lower surface of the tongue providing an extended bearing upon the floor of the groove to guard against rapid wear of the contacting surfaces.

In assembling these parts the union-block is placed in its socket, whose depth is in excess of the length of the block, after which the stem is stepped in the housing and the pin 8 driven to place, this driving of pin 8 to place forcing the union-block forward and bringing its tongue into engagement with the groove in the stem. Pin 8 need only fit with sufficient tightness to insure against accidental displacement, and it may be withdrawn when the caster is to be taken apart.

The scraper 14 serves to remove foreign matters from the treads of the floor-wheels and is held to its work by the action of the spring. The heel of the spring is secured to the scraper by passing through an aperture therein and then being bent over one edge of the scraper. By releasing this bend in the spring it may be withdrawn rearwardly from the scraper and the scraper removed. The spring may be adjusted in tension by appropriately bending its body, thus regulating the pressure with which the scraper bears upon the floor-wheels.

I claim as my invention—

1. In a caster, the combination, substantially as set forth, of a housing having a step-bearing and a horizontal cylindrical socket above the base of said bearing, a stem having its foot stepped in said bearing and provided with a circumferential groove, and a cylindrical union-block journaled in said socket and having a tongue engaging said groove, said union-block being adapted for angular motion in said socket under the influence of said grooved stem.

2. In a caster, the combination, substantially as set forth, of a housing having a step-bearing and a horizontal cylindrical socket above the base of said bearing, a stem having its foot stepped in said bearing and provided with a circumferential groove, and a cylindrical union-block journaled in said socket and having a tongue with a flat lower surface engaging said groove.

3. In a caster, the combination, substantially as set forth, of a housing having a step-bearing and a horizontal cylindrical socket above the base of said bearing, a stem having its foot stepped in said bearing and provided with a circumferential groove, a cylindrical union-block journaled in said socket and having a tongue engaging said groove, and a pin tightly engaging an aperture in the housing and bearing against the rear end of said union-block.

4. In a caster, the combination, substantially as set forth, of a stem, a pair of floor-wheels, a housing articulated to the stem and having a rearwardly-projecting horn with a horizontal aperture therein, and a scraper disposed in said aperture and projecting outwardly sidewise from the perforation in said horn and engaging the treads of the floor-wheels.

5. In a caster, the combination, substantially as set forth, of a stem, a pair of floor-wheels, a housing articulated to the stem and having a rearwardly-projecting horn with a horizontal circular aperture, and a scraper semicircular in cross-section disposed in said aperture and projecting sidewise from the horn and engaging the treads of the floor-wheels.

6. In a caster, the combination, substantially as set forth, of a stem, a pair of floor-wheels, a housing articulated to the stem and having a rearwardly-projecting horn with a horizontal aperture, a scraper disposed in said aperture and projecting sidewise from the horn and engaging the treads of the floor-wheels, and a spring engaging said housing and scraper and serving to hold the scraper yieldingly to the wheels.

7. In a caster, the combination, substantially as set forth, of a stem, a pair of floor-wheels, a housing articulated to the stem and having a vertically-slitted rearwardly-projecting horn with a horizontal aperture, a scraper disposed in said aperture and projecting sidewise from the horn and engaging the treads of the floor-wheels, and a wire spring disposed in the slit of the horn and having its heel secured to the scraper and its free end engaging the housing.

8. In a caster, the combination, substantially as set forth, of a stem, a pair of floor-wheels, a housing articulated to the stem and having a vertically-slitted rearwardly-projecting horn with a horizontal aperture, a scraper disposed in said aperture and projecting sidewise from the horn and engaging the treads of the floor-wheels, and a wire spring disposed in said slit and having its heel bent about a portion of the scraper and having its free end engaging the housing.

9. In a caster, the combination, substantially as set forth, of a stem, a pair of floor-wheels, a housing articulated to the stem and having a vertically-slitted rearwardly-projecting horn with a horizontal aperture, a scraper disposed in said aperture and projecting sidewise from the horn and engaging the treads of the floor-wheels, and a wire spring having its heel passing through an aperture in the scraper and bent about a portion of the scraper and having its free end in engagement with the housing.

CHARLES STENGEL.

Witnesses:
ELMER R. SHIPLEY,
M. S. BELDEN.